June 19, 1962  P. H. LANG ET AL  3,040,318
RADAR ANTENNA AZIMUTH CONTROL AND SEARCH SYSTEM
Filed Aug. 9, 1950  5 Sheets-Sheet 1
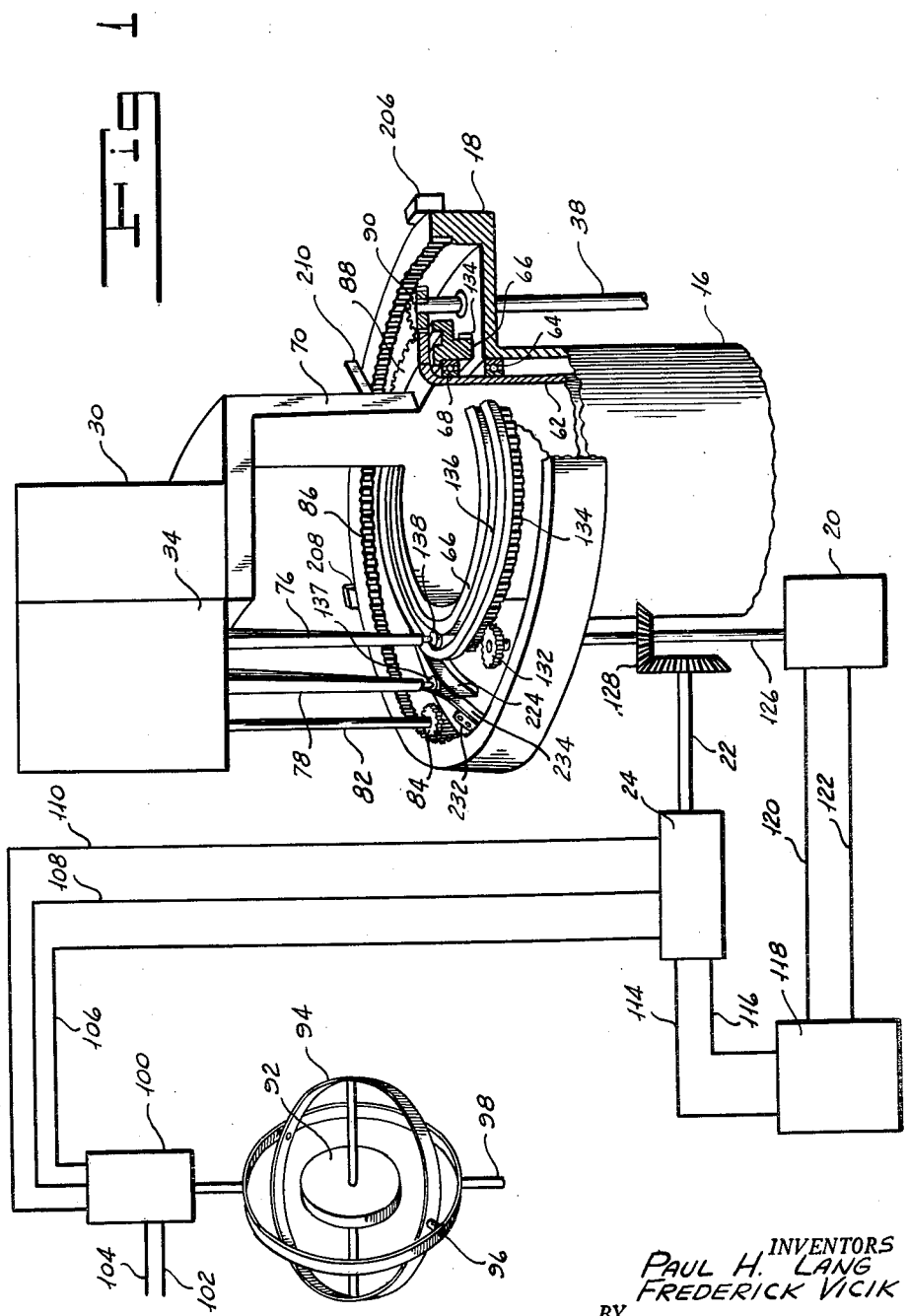
INVENTORS
PAUL H. LANG
FREDERICK VICIK
BY
Henry L. Shenier
ATTORNEY

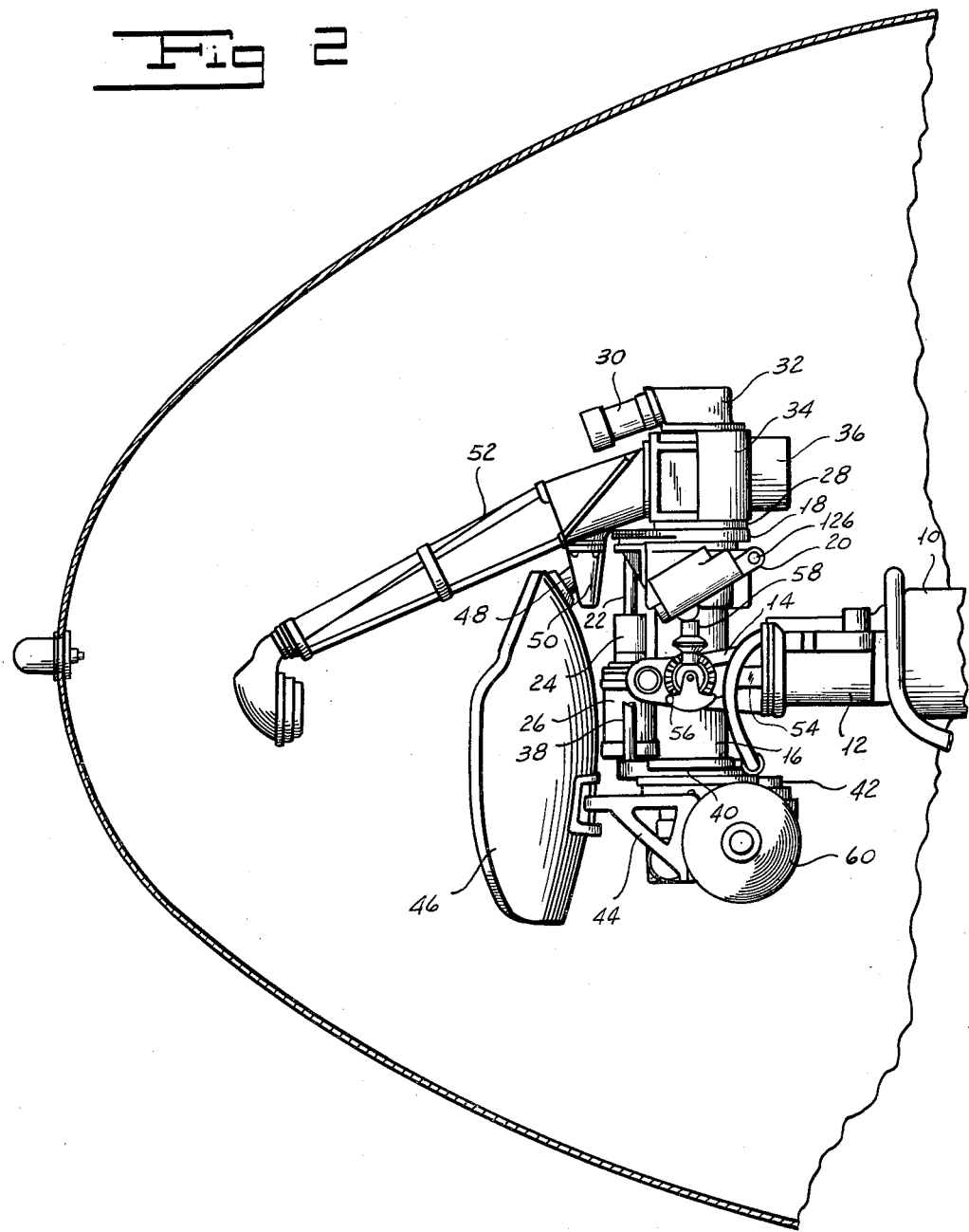

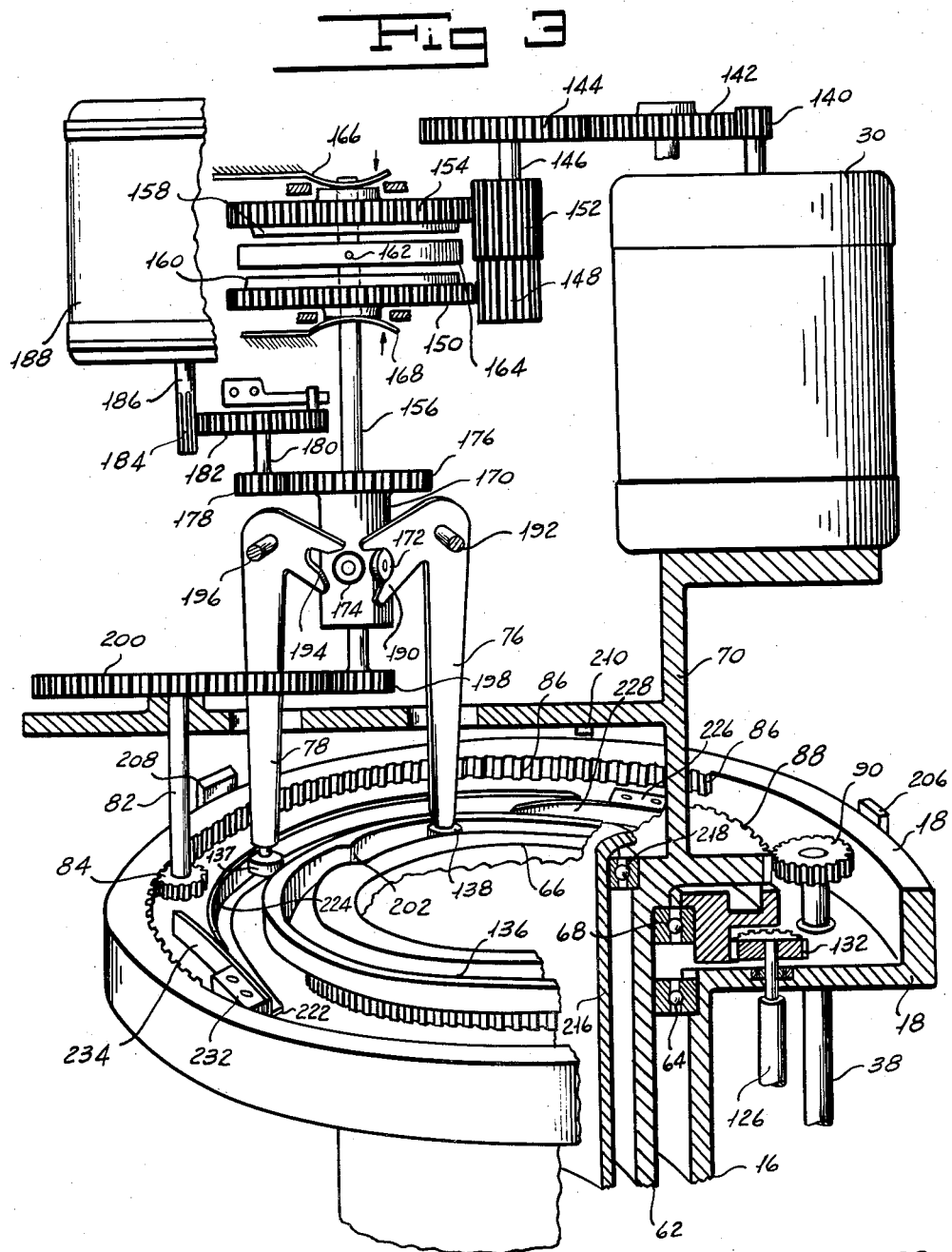

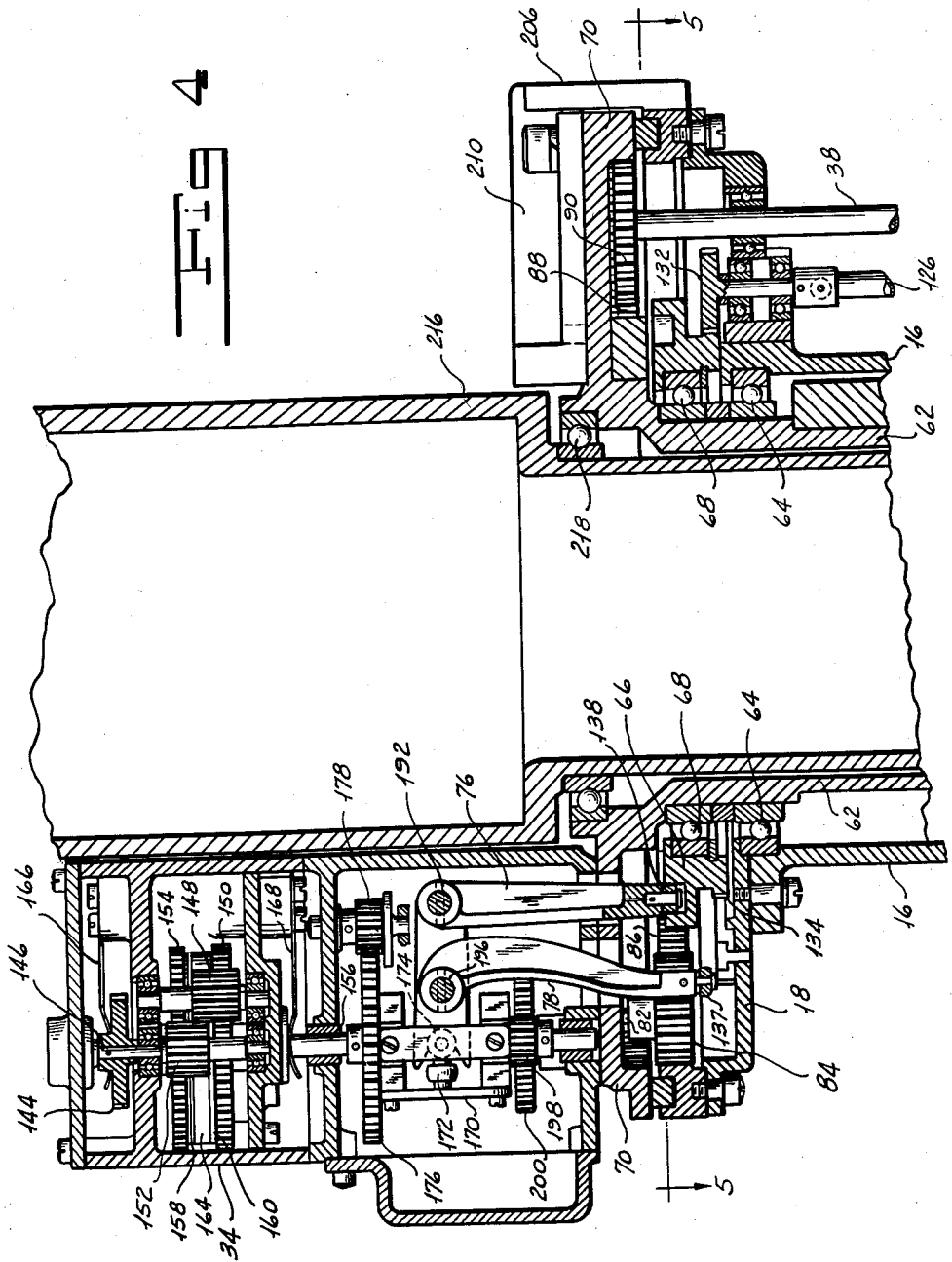

June 19, 1962 P. H. LANG ET AL 3,040,318
RADAR ANTENNA AZIMUTH CONTROL AND SEARCH SYSTEM
Filed Aug. 9, 1950 5 Sheets-Sheet 5
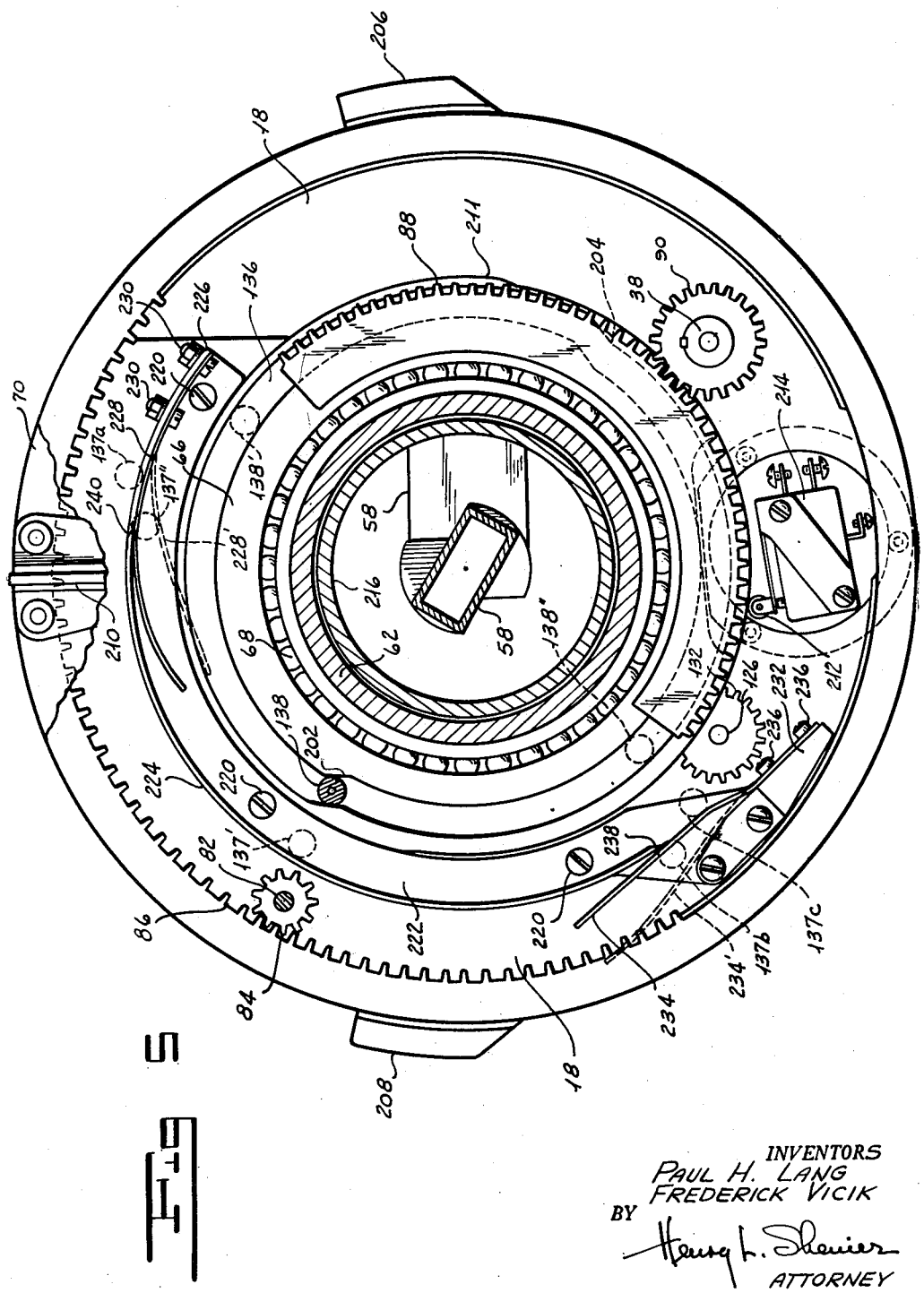
INVENTORS
PAUL H. LANG
FREDERICK VICIK
BY
ATTORNEY United States Patent Office 3,040,318
Patented June 19, 1962

3,040,318
RADAR ANTENNA AZIMUTH CONTROL AND
SEARCH SYSTEM
Paul H. Lang, Katonah, and Frederick Vicik, Tuckahoe, N.Y., assignors, by mesne assignments, to United Aircraft Corporation, East Hartford, Conn., a corporation of Delaware
Filed Aug. 9, 1950, Ser. No. 178,416
11 Claims. (Cl. 343—760)

Our invention relates to an antenna azimuth control and search system, and more particularly to an assembly in which an antenna may be oriented and stabilized in azimuth along any given line of sight, which line of sight may be used as a reference point for a rapid scanning movement for the antenna and in which the antenna may be controllably disconnected from the oriented line of sight and oscillated relatively to the axis of the aircraft for searching.

In connection with radar bombsights and radar for navigational and other purposes carried by aircraft or by moving vessels of any description, means must be provided for oscillating the antenna so that the microwave beam may be oscillated through an angle for searching in order to give a picture of the terrain on a plan position indicator known to the art. Many methods for oscillating an antenna have been suggested. These, however, are expensive to construct and require large and weighty equipment. Since weight is a prime factor of consideration in an aircraft this disadvantage is serious. Frequently it is necessary to orient the radar beam and maintain it along a given line of azimuth or to scan along a narrow angle with reference to an oriented direction. In the devices of the prior art separate systems are required for this service and they have been complicated to construct, difficult to maintain, and uncertain in their operation.

One object of our invention is to provide a simple, convenient and automatic system for search scanning to oscillate an antenna through a predetermined angle.

Another object of our invention is to provide a scanning system which may be rapidly shifted from a search scanning to an oriented scanning along a stabilized line of sight in which many parts are used in common.

Another object of our invention is to provide an antenna azimuth control and search system which is light in weight, certain in operation and easy to maintain.

Another object of our invention is to provide a scanning system in which the power for stabilization in azimuth and for search scanning is delivered by a common prime mover through a torque amplifier to which the input may be readily shifted to achieve search scanning or a controlled stabilized line of sight.

Other and further objects of our invention will appear from the following description.

In the accompanying drawings which form part of the instant specification and which are to be read in conjunction therewith and in which like reference numerals are used to indicate like parts in the various views:

FIGURE 1 is a diagrammatic view showing one embodiment of our invention.

FIGURE 2 is a sectional view through the nose of an aircraft showing a radar antenna azimuth control and search system with which our invention is adapted to be employed.

FIGURE 3 is a diagrammatic view showing the details of the torque amplifier and the input shifting means thereto.

FIGURE 4 is a sectional view through a radar antenna control and search system containing one embodiment of our invention showing the actual construction.

FIGURE 5 is a sectional view taken along the line 5—5 of FIGURE 4.

In the copending application of Maurits ten Bosch et al., Serial No. 178,458, filed August 9, 1950, there is shown a stabilized scanning radar antenna in which an antenna may be oscillated around an oriented line of sight through an angle of 12½° on each side thereof at a rate of either two looks per second or ten looks per second, and in which the inertia of the oscillatory movement is automatically compensated. Our invention is particularly adapted to define the line of sight around which the oscillatory scanning movement takes place. We can, further, whenever the narrow scanning movement is discontinued, employ our system for oscillating an antenna in a search scan through 75° on each side of the fore-and-aft axis of the aircraft at a comparatively slow rate of, say, one-half look per second.

Referring now to FIGURE 2, a support 10 is carried by the aircraft rotatably housing a tube 12 which is adapted to oscillate around the fore-and-aft or roll axis of the aircraft. This tube is stabilized in a horizontal plane around the roll axis and carries a fork 14 in which we pivot a vertical column 16 for oscillation around the athwartship or pitch axis of the aircraft. Means (not shown) are provided for stabilizing the column around the pitch axis. An azimuth control member is rotatably carried in the upper portion 18 of the stable column and is controlled by an azimuth servomotor 20 to orient the rotatable member in azimuth, as will be described hereinafter more fully. The movements of the rotatable member in azimuth are communicated by shaft 22 to an azimuth expansion synchro 24 and to a sweep resolver 26 which is adapted to describe the line of sight on the radarscope. A rotatable azimuth tube 28 is carried by the stable column 16. This carries a torque amplifier drive motor 30, a gear housing 32, and a torque amplifier 34. The movements of the rotatable member controlled in azimuth are, in one position of parts, used as the input to the torque amplifier so that the output of the torque amplifier will orient the azimuth tube 28. A counterweight 36 is provided to balance the parts. The movements of the azimuth tube 28 are communicated by shaft 38 to a gear within housing 40 carried by the lower portion of the stable column 16. A prime mover carried by the lower portion of the column is adapted to operate a crank to oscillate the lower rotatable member 42 carried by the stable column against the stabilized gear, as is described more fully in said copending application of Maurits ten Bosch et al. The lower rotatable member 42 carries a bracket 44 to which is secured an antenna reflector 46, the upper end of which is connected by bracket 48 through vartical adjusting means 50 to the microwave feed-horn assembly 52. As the lower movable member 42 oscillates, it will carry the antenna reflector 46 and the feed-horn around with it, the upper portion of the feed-horn assembly being carried by a rotatable member supported by the stable column. The microwaves are fed through a microwave guide 54 from a transmitter and receiver (not shown) to a wave guide rotary joint 56 positioned around the pitch axis, thence through wave guide 58 to within the stable column, and thence upwardly to the feed-horn, through a wave guide rotary joint positioned around the azimuth axis (not shown), it being understood that the microwave guide 54 is connected to the source of microwaves through a rotary joint positioned around the roll axis. The lower rotatable member 42 carries inertia compensators positioned within housings 60, as described in said copending application of Maurits ten Bosch et al.

Referring now to FIGURE 1, the stable column 16 rotatably supports the azimuth tube 62 in bearings 64. An azimuth cam 66 is rotatably carried by bearings 68. The azimuth tube 62 carries a support 70 supporting the torque amplifier drive motor 30 and the torque amplifier 34. The torque amplifier is adapted to be controlled by an input arm 76 which is controlled by the azimuth cam 66 or by an input lever 78 which is controlled by a flange cam member 224, as will be described more fully hereinafter. The output of the torque amplifier is by way of shaft 82 which carries a pinion 84 meshing with the internal teeth 86 formed in the stable column flange 18. By reaction the support 70 is rotated, through the output of the torque amplifier, carrying with it the azimuth tube 62. The movements of the azimuth tube are communicated by means of external gear teeth 88 meshing with pinion 90 secured to a torque tube 38 which leads to the stabilized gear in the lower portion of the stable column 16 against which the oriented scanning movement takes place. Whenever the oriented scanning mechanism is immobilized the torque tube 38 will rotate the lower rotatable member 42 and carry the antenna dish 46 and the feed-horn around agreeable to the movements of the torque tube. A gyroscope wheel 92 having a horizontal spin axis is carried in a gimbal ring 94 pivoted to a vertical gimbal ring 96, which is in turn pivoted around vertical shaft 98 so that this shaft will move in azimuth relative to changes of the aircraft in course. The rotor of a synchro 100 is connected to the shaft 98 and is energized through conductors 102 and 104, forming a single-phase rotor. The stator of the synchro is Y-wound and connected by conductors 106, 108 and 110 to the stator of an azimuth synchro 24. The rotor of the azimuth synchro 24 is connected by conductors 114 and 116 to an amplifier 118, the output of which is led by conductors 120 and 122 to an azimuth servo-motor 20 adapted to rotate the shaft 126 agreeable to the movement of the aircraft in azimuth. Shaft 126 rotates a bevel gear 128 which is connected to rotate shaft 22 to control the rotor of the synchro 24. The arrangement is such that whenever the shaft 126 is in a position agreeable to the shaft 98, the output of synchro 24 will be zero. The rotation of shaft 126 also rotates a pinion 132 which engages the teeth 134 formed on the azimuth cam 66. The azimuth cam is provided with a cam track 136 in which a follower 138 carried by the lower end of lever 76 is positioned.

Referring now to FIGURE 3, the torque amplifier motor 30 drives a pinion 140 which drives gear 142, driving gear 144 and rotating shaft 146 to which is secured an elongated gear 152. The gear 152 meshes with a gear 154 and with a pinion 148. The pinion 148 meshes with a gear 150 so that gear 154 rotates in a direction opposite from gear 150. Both gears 150 and 154 are loosely mounted on a shaft 156 for relative rotation therewith. The gear 154 carries a clutch lining 158 and the gear 150 carries a clutch lining 160. The shaft 156 is axially movable, and carries secured thereto by means of pin 162 a clutch disk 164. When the shaft 156 moves upwardly the clutch disk 164 will be carried into contact with the lining 158 and will move against the action of spring 166 to engage the gear 154 with the clutch plate 164 rotating the shaft 156 in one direction. When the shaft 156 is moved axially downwardly the clutch plate 164 will be carried into engagement with the clutch lining 160 carried by the gear 150 acting against spring 168 and causing the shaft 156 to be operated in the direction of rotation of gear 150 which is opposite to the direction of rotation of gear 154. A housing 170 is carried by shaft 156 relatively rotatable with respect thereto but constrained against axial movement with respect to the shaft 156. A lug 172 and a lug 174 are carried by the housing 170. A gear 176 meshes with a gear 178 carried by shaft 180 to which is also secured a gear 182 meshing with a pinion 184 carried by the shaft 186 of the motor 188. As the pinion 184 is rotated in a counterclockwise direction viewed from above, the gear 176 will be rotated in the same direction, causing the lug 172 to lodge within the fork 190 of the lever 76 which is pivoted about shaft 192, as shown in FIGURE 3. When the pinion 184 is rotated in a clockwise direction, the gear 176 will rotate in a clockwise direction carrying the lug 174 into engagement with the fork 194 of the bell crank 78 which is pivoted about shaft 196. As the bell crank 76 rotates about its shaft 192 it will move the housing 170 upwardly or downwardly carrying the shaft 156 with it to engage the clutch plate 164 with one of the rotating clutch gears driving the shaft 156 in one direction or the other and rotating pinion 198 driving gear 200. This rotates shaft 82 and pinion 84 carrying the support and hence the azimuth tube 62 around with it. Whenever the lug 174 is engaged in the fork 194 of the bell crank 78 the movements of this bell crank, as controlled by its follower 137 in conjunction with cam 224, will control the direction of rotation of shaft 156 and hence the direction of rotation of the azimuth tube 62.

Referring now to FIGURE 5, it will be observed that the cam track 136 comprises substantially two semicircles of differing radius connected by a pair of steps. The step 202 may be referred to as the stable step, and the step 204 may be referred to as the unstable step. The rotation of the clutch gears 150 and 154 and the gear train is such that whenever the shaft 156 moves upwardly the azimuth tube 62 will rotate in a counterclockwise direction, as viewed in FIGURE 5.

The showing of the bell cranks 76 and 78 in FIGURE 3 is diagrammatic only, the actual construction being shown in FIGURE 4. It will be observed by reference to FIGURE 4 that when the lower end of bell crank 76 moves radially outwardly, as would be caused by the movement of the cam 66 in a counterclockwise direction, then crank 76 will be rotated in a clockwise direction, as viewed in FIGURE 4, thus lifting the shaft 156 through the lug 172 if this lug were engaged. In FIGURE 4 the lug 172 is shown in the disengaged position, but by operating the motor 188 to rotate the pinion 178 in a counterclockwise direction, as viewed from above, the gear 176 will be rotated in a clockwise direction carrying the cage with it to disengage lug 174 from the fork of bell crank 78 and engage the lug 172 with the fork of bell crank 76. It is to be observed that the forks are disposed at a wide angle and that the lugs carry rollers so that the position of engagement will not be critical and the lugs will always be seated at the bottom of the fork regardless of the position that the fork occupies temporarily due to the fact that the mouth of the fork is large enough to cover the amplitude of movement. When the shaft 156 is lifted the clutch plate 164 will be engaged with the gear 154 so that the shaft 156 will rotate in the direction of rotation of the gear 154. The motor pinion 140 is being driven in a clockwise direction, as viewed from above. This drives the idler gear 142 in a counterclock direction and the gear 144 in a clockwise direction, driving pinion 152 in a clockwise direction and gear 154 in a counterclockwise direction. The pinion 148 will likewise be driven in a counterclockwise direction, and it in turn will drive the gear 150 in a clockwise direction. The rotation of shaft 156 in a counterclockwise direction will rotate the pinion 198 in a counterclockwise direction and its engaging gear 200 in a clockwise direction, thus driving shaft 82 and its pinion 84 in a clockwise direction, thus carrying the platform 70 on which the shaft 82 is mounted around in a counterclockwise direction due to the inner action of the gear 84 with the stationary ring gear 86 formed on the stable platform 18. As the platform 70 moves around in a counterclockwise direction it will carry with it the bell crank 76 until the follower 138 reaches the position in the stable step shown in full lines in FIGURE 5, in which position the clutch plate 164 is intermediate the two oppositely rotating gears 154 and 150 and in engagement with neither. If the azimuth cam 66 is rotated in a clockwise direction, as viewed in FIGURE 5, the follower 138 will move into the cam track of smaller diameter rotating the crank 76 in a counterclockwise direction, as viewed in FIGURE 4, lowering the shaft 156 and bringing the clutch plate 164 into engagement with the clockwise rotating gear 150, thus rotating the pinion 198 in a clockwise direction, the gear 200 in a counterclockwise direction, and with it the shaft and pinion 84. The rotation of this pinion in a counterclockwise direction will move the platform and hence the azimuth tube in a clockwise direction, as viewed in FIGURE 5. The amplitude of motion of the parts, however, is such that it is limited to an angle of 75° on each side of the center line of the aircraft and the stable platform 18 is provided with a pair of stops 206 and 208 disposed 75° on each side of the longitudinal axis of the aircraft. The rotatable supporting member 70 which is carried by the azimuth tube is provided with a coacting spring stop member 210, shown in FIGURES 4 and 5, which is adapted to engage the fixed stop member 206 or 208. Let us assume that the azimuth cam 66 is rotated in a clockwise direction, as viewed in FIGURE 5. The azimuth tube and the support member 70 will follow around in a clockwise direction until the stop member 210 engages the stop 206, the torque amplifier driving the azimuth tube against the stop and maintaining it there. The dotted line circle 138' will indicate the position of the follower 138. The azimuth cam, however, will continue rotating in a clockwise direction until the unstable step catches up with the follower in the position shown in 138'. As soon as the unstable step passes the follower, the follower 138 will be moved radially outwardly, causing the torque amplifier to reverse the direction of drive to rotate the azimuth tube and assembly in a counterclockwise direction until the spring stop member 210 engages the fixed stop member 208. When this occurs the follower 138 will occupy the dotted line position 138" and will remain in this position waiting for the stable step to pick up the follower and again direct its movements. Since the angle between the positions 138' and 138" is 150°, and the angle between the stable step and the unstable step is 180°, the follower has to wait only through 30° of movement of the azimuth cam, assuming that the azimuth cam continues to rotate in a clockwise direction. In this manner, the assembly is always in a position immediately to accept control as soon as the stable step is within the 150° sector of control. The edge of the azimuth cam 66 is formed with a cam 211 which is so positioned that when the stable step 202 passes into the 210° rearward arc in which the stable step no longer controls the azimuth tube, the cam will contact the follower 212 to operate a cutout switch 214 adapted to remove the azimuth line on a viewing cathode ray tube established by the sweep resolver, notifying the operator immediately that the desired line of sight is out of the 150° forward arc.

It will be seen that as long as the lug 172 is in engagement with the fork of crank 76, the azimuth cam 66 will, within the 150° forward arc, control the orientation of the azimuth tube 62 and will position the lower oriented gear (not shown) by means of the torque tube 38. The oscillatory motion of scanning performed by the crank may, if desired, be communicated to the antenna feed-horn by an inner rotatable member 216 mounted in bearings 218 carried by the platform 70. This inner rotatable member 216 may be connected to the bottom rotatable member 42 in any suitable manner so as to rotate with it as a unit.

Let us now assume that the cage 170 is rotated to bring the lug 174 into engagement with the fork on the bell crank 78 in the position shown in FIGURE 4. When this occurs the crank 76 is disconnected from its control of shaft 156 and this office is now transferred to the crank 78. The stable platform 18 has secured thereto by means of screws 220 an angle member 222 having an upstanding flange 224. A bracket 226 carries a leaf spring 228 secured thereto by means of bolts 230. The other end of the angle member carries a bracket 232 to which is secured a second leaf spring 234 by means of screws 236. The leaf spring 234 engages the outside of the end 238 of the flange 224. The leaf spring 228 engages the inside of the end 240 of the flange 224. The curved flange 224 acts as a cam for the control together with the springs 228 and 234 of the crank 78. Let us assume that the follower 137 carried by the crank 78 is in the position 137', shown in FIGURE 5, that is, on the inside of the flange 224. To achieve this position the crank 78 must have been rotated in a counterclockwise direction, as viewed in FIGURE 4, to a position moving the shaft axially downwardly, thus bringing the clutch member 164 into engagement with the gear 150 which, it will be recalled, is rotating in a clockwise direction as viewed from above. The effect will be to cause the azimuth tube and platform 70 to rotate in a clockwise direction as viewed in FIGURE 5, carrying the follower 137 into the angle formed by the end of the spring 228 and the right-hand edge of the curved cam flange 224. This causes the spring 228 to deflect to the dotted line position 228' when the follower 137 is in the position 137". As soon as the follower moves past the edge 240 of the flange cam 224, it will be moved to the position indicated by the dotted circle 137a. When the follower, however, moves to this position it rotates the bell crank 78 in a clockwise direction, as viewed in FIGURE 4, and lifts the shaft 156, causing the clutch plate 164 to become engaged with the gear 154 which is rotating in a counterclockwise direction, thus driving the azimuth tube in a counterclockwise direction, as viewed in FIGURE 5. The follower then will be engaged with the outside surface of the flange cam 224 and the azimuth tube will rotate in a counterclockwise direction until the follower engages the spring 234. This motion continues until the spring occupies the dotted line position 234' and the follower will be in the position shown by the dotted circle 137b. As soon as the follower clears the end 238 of the curved cam 224 it will be moved to the dotted line position 137c. In so doing it will rotate the crank 78 in a counterclockwise direction lowering the shaft 156 and again causing the torque amplifier to drive the azimuth tube in a clockwise direction. The position of the ends 240 and 238 of the curved flange cam 224 is such that this movement will cover 75° on each side of the longitudinal center line of the aircraft. The searching movement will take place as long as the motor 30 is running and the torque amplifier will be controlled by the input governed by the follower 137.

During this searching movement just described, the azimuth tube 62 will rotate the torque tube 38, rotating the azimuth gear carried by the lower portion of the stable column 16. Since in the searching movement occasioned by the follower 137 acting against the cam flange 224 the lower movable member is locked to the azimuth gear, the rotation of the azimuth gear will carry the lower movable member and the antenna dish around during the searching movement and will likewise rotate the inner scanning column 216.

It will be seen that we have accomplished the objects of our invention. We have provided an antenna azimuth control and search system in which the system may be operated to search on each side of the center line of the aircraft or to scan on each side of an oriented line of sight, at the will of the operator. The system can be changed from the search scanning arrangement to the oriented scanning arrangement in a simple, convenient and expeditious manner. In view of the fact that the same mode of power is used to control the line of orientation and to operate the search scanning system, great saving in weight is achieved.

We have provided a simple, convenient and automatic system for search scanning in which an antenna is oscillated through a predetermined angle.

We have provided a scanning system which may be rapidly shifted from a search scanning to an oriented scanning along a stabilized line of sight in which many parts are used for both systems.

We have provided an antenna azimuth control and search system which is light in weight, certain in operation and easy to maintain.

We have provided a scanning system in which a torque amplifier having two inputs is adapted to control the scanning from the input selected to control and this selection may be made in a simple, rapid and certain manner.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In a system of the character described, a rotatable member, means for mounting said rotatable member for rotation about a predetermined axis, a prime mover carried by the rotatable member, a reversible transmission driven by the prime mover, an output shaft driven by the transmission, control means for selectively controlling the transmission to drive the output shaft in one direction or a direction opposite thereto, means responsive to the rotation of the output shaft for rotating the rotatable member, positioning means for the control means, and means responsive to relative movement between the rotatable member and the positioning means for moving the control means to cause the rotatable member to rotate in a direction to produce an opposite relative movement.

2. A system as in claim 1, in which said predetermined axis is vertical and said means for mounting the rotatable member comprises a column, means for mounting said column for rotation about a pair of axes disposed at right angles to each other and at right angles to said vertical axis and means for stabilizing said column about said pair of axes at right angles to each other.

3. A system as in claim 1, in which said means for mounting said rotatable member carries a second rotatable member and means responsive to the rotation of said first rotatable member for rotating said second rotatable member.

4. A system as in claim 1, in which said means for mounting said rotatable member carries a second rotatable member, means responsive to the rotation of said first rotatable member for rotating said second rotatable member, a radar antenna and feed-horn carried by said mounting means and means responsive to the position of said second rotatable member for orienting said radar feedhorn and antenna.

5. A system as in claim 1, in which said control means for selectively controlling said transmission comprises a pair of separate means, said positioning means for said control means comprises a pair of separate means adapted to coact with respective control means and interlocking means for rendering one of said control means operative and the other of said control means inoperative.

6. A system as in claim 1, in which said predetermined axis extends vertically, said positioning means comprises a cam mounted for rotation about said predetermined axis and means for orienting said cam in azimuth.

7. A system as in claim 1, in which said mounting means is provided with a pair of separated fixed stop members and said rotatable member is provided with a coacting stop member, the construction being such that said rotatable member is confined to rotate between the fixed stop members.

8. A system as in claim 1, in which said predetermined axis extends vertically, said positioning means comprises a cam mounted for rotation about said predetermined axis, means for orienting said cam in azimuth, said cam being provided with a pair of steps, a follower carried by the control means coacting with said cam, one of said steps adapted to position the control means to cause the rotatable member to follow the rotary movement of the cam and the other of said steps being adapted to position the control means to cause the rotatable member to rotate in a direction opposite from the direction of rotation of the cam.

9. A system as in claim 1, in which said positioning means for the control means comprises an arcuate cam having a pair of control surfaces, a follower carried by the control means adapted to coact with said control surfaces, one of said control surfaces adapted to position the control means to cause the rotatable member to rotate in one direction and the other of said control surfaces adapted to position the control means to cause the rotatable member to rotate in the opposite direction and means for shifting the follower from contact with one control surface to contact with the other control surface after the rotatable member has rotated through a predetermined arc in one direction.

10. A system as in claim 1, in which said positioning means for the control means comprises an arcuate cam having a pair of control surfaces, a follower carried by the control means adapted to coact with said control surfaces, one of said control surfaces adapted to position the control means to cause the rotatable member to rotate in one direction and the other of said control surfaces adapted to position the control means to cause the rotatable member to rotate in the opposite direction, means for shifting the follower from contact with one control surface to contact with the other control surface after the rotatable member has rotated through a predetermined arc in one direction and a second means for shifting the follower from contact with one of the control surfaces to the other of the control surfaces after the rotatable member has rotated a predetermined distance in the opposite direction, the construction being such that the rotatable member will be oscillated through a predetermined arc between said shifting means.

11. A system as in claim 1, in which said positioning means comprises a rotatable cam, a follower carried by said control means adapted to coact with said cam, electrical signal-producing means including a switch adapted to indicate the position of said cam and a second cam carried by said first cam adapted to operate said switch to interrupt said signal-producing means whenever said rotatable cam is between predetermined limits of rotation.

No references cited.